United States Patent
Ando et al.

(10) Patent No.: US 10,193,426 B2
(45) Date of Patent: Jan. 29, 2019

(54) METHOD FOR MANUFACTURING A STACKED IRON CORE OF A VEHICLE DRIVE MOTOR

(71) Applicant: NHK SPRING CO., LTD., Yokohama-shi, Kanagawa (JP)

(72) Inventors: Shuji Ando, Kanagawa (JP); Michinobu Hirama, Kanagawa (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 184 days.

(21) Appl. No.: 15/327,347

(22) PCT Filed: Jul. 27, 2015

(86) PCT No.: PCT/JP2015/071291
§ 371 (c)(1),
(2) Date: Jan. 18, 2017

(87) PCT Pub. No.: WO2016/013683
PCT Pub. Date: Jan. 28, 2016

(65) Prior Publication Data
US 2017/0179797 A1    Jun. 22, 2017

(30) Foreign Application Priority Data

Jul. 25, 2014   (JP) ................................ 2014-152094

(51) Int. Cl.
*H02K 15/02* (2006.01)
*B23K 26/21* (2014.01)
(Continued)

(52) U.S. Cl.
CPC ............ *H02K 15/02* (2013.01); *B23K 26/21* (2015.10); *B23K 26/26* (2013.01); *B23K 2101/36* (2018.08); *B23K 2103/02* (2018.08)

(58) Field of Classification Search
CPC .... B23K 26/21; B23K 26/26; B23K 2101/36; B23K 2103/02; H02K 15/02
See application file for complete search history.

(56) References Cited

U.S. PATENT DOCUMENTS 3,293,471 A * 12/1966 Lacy ...................... H02K 1/146
                                                        310/216.065
2003/0151327 A1* 8/2003 Ramirez .................. H02K 1/16
                                                        310/216.062

FOREIGN PATENT DOCUMENTS

EP          2395636 A2    12/2011
JP      2010-028929 A     2/2010
(Continued)

*Primary Examiner* — Carl Arbes
(74) *Attorney, Agent, or Firm* — Knobbe, Martens, Olson & Bear, LLP

(57) ABSTRACT

In a method for manufacturing a stacked iron core, a stacked iron core body is manufactured by stacking so as to be phase-offset with respect to each other in the circumferential direction plural ring-shaped iron core pieces respectively configured by plural circular arc-shaped iron core pieces arranged into ring shapes. Next, each layer of the circular arc-shaped iron core pieces, which are phase-offset with respect to each other in the circumferential direction, is welded together along a stacking direction at plural locations (plural weld portions) arranged around the circumferential direction of an inner circumferential portion or an outer circumferential portion of the stacked iron core body. A pair of key protrusions is formed on inner circumferential portions of the stacked iron core at positions opposing each other, and so key components are rendered unnecessary when assembling a rotor of a vehicle drive motor.

3 Claims, 10 Drawing Sheets

(51) Int. Cl.
  *B23K 26/26*   (2014.01)
  *B23K 101/36*  (2006.01)
  *B23K 103/02*  (2006.01)

(56) References Cited

FOREIGN PATENT DOCUMENTS

| JP | 2010-045921 A | 2/2010 |
| JP | 2013-005628 A | 1/2013 |
| JP | 2014-72988 A | 4/2014 |

* cited by examiner

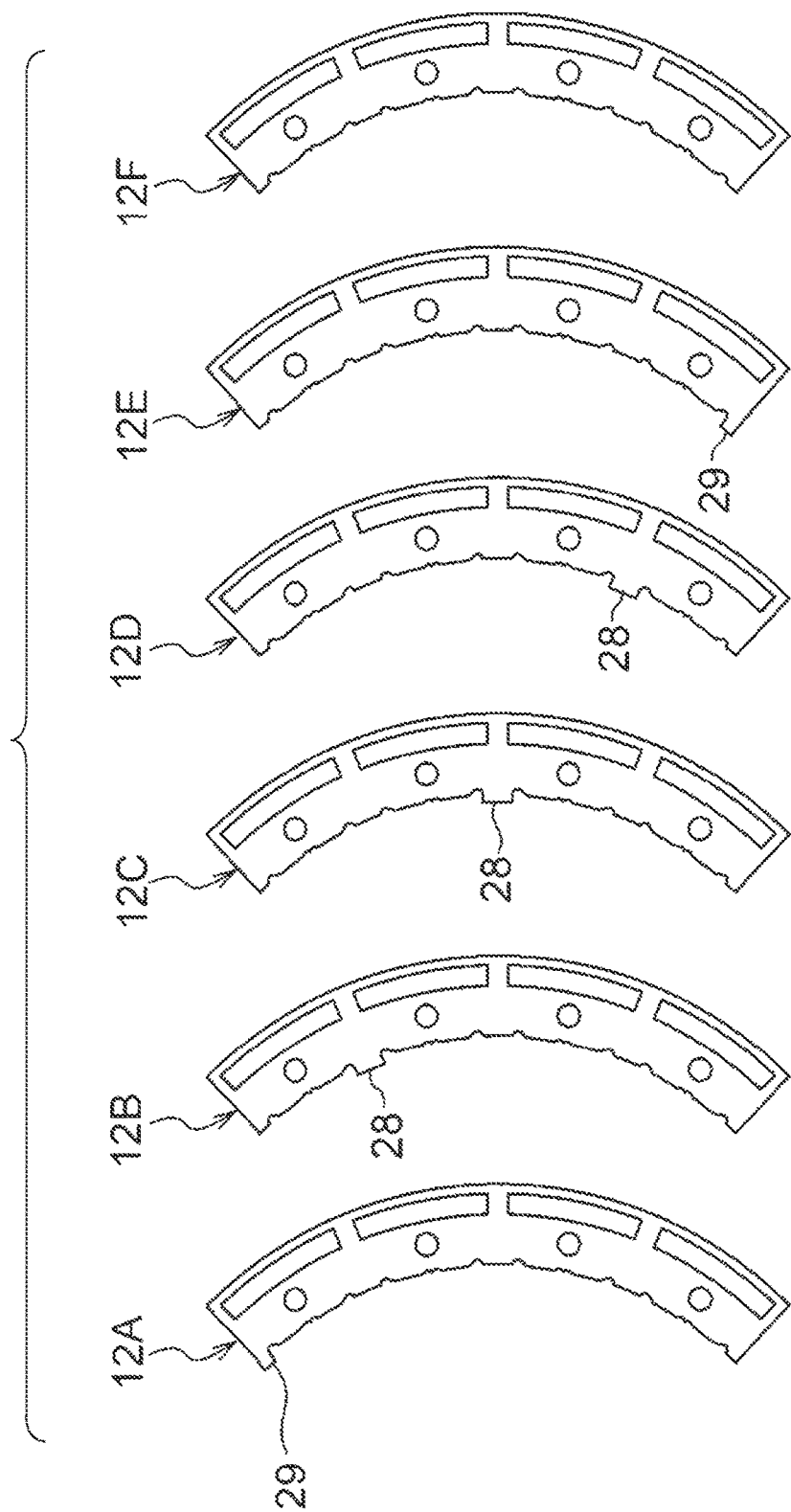

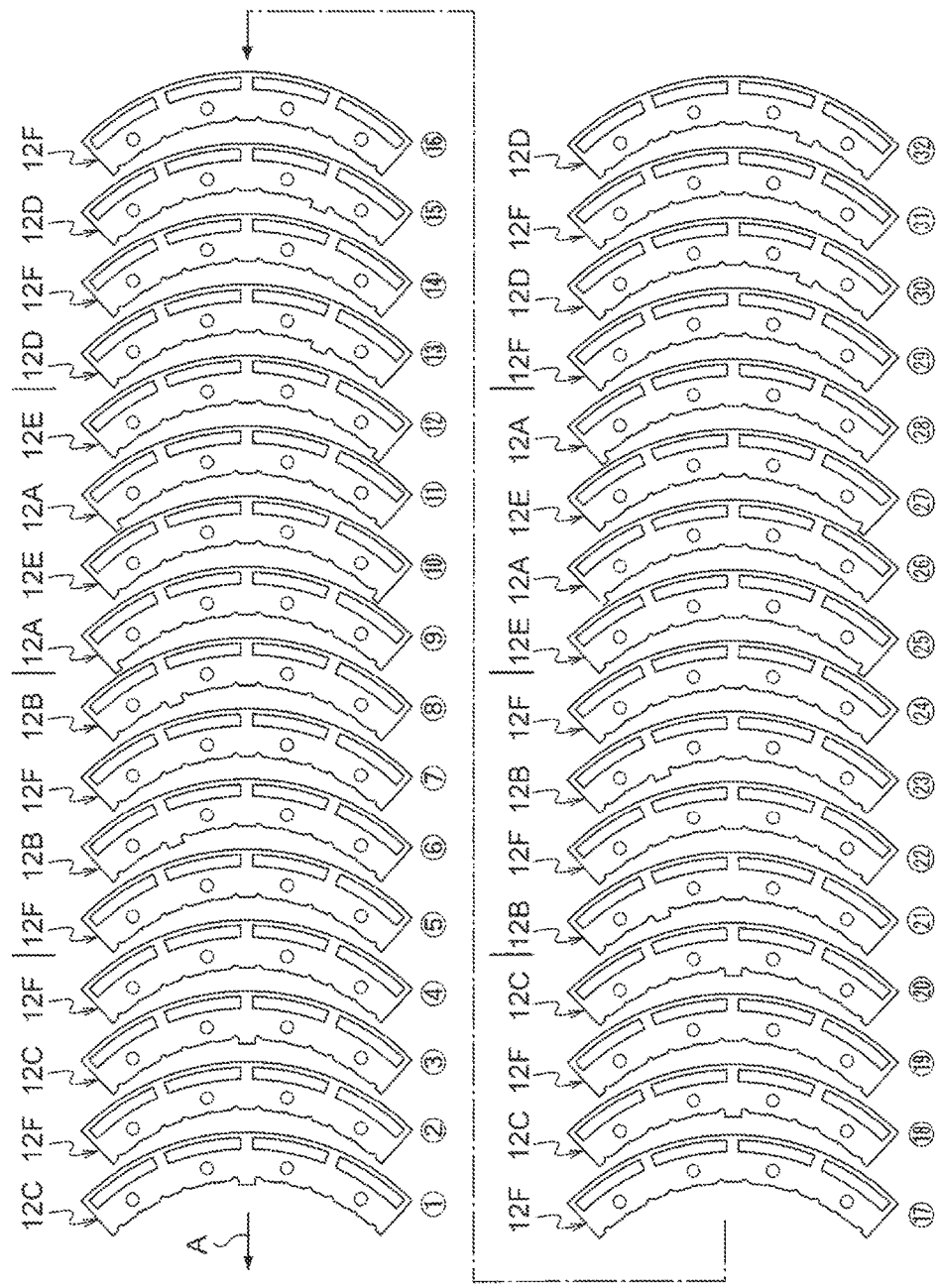

METHOD FOR MANUFACTURING A STACKED IRON CORE OF A VEHICLE DRIVE MOTOR

CROSS-REFERENCE TO RELATED APPLICATIONS

This application is the U.S. National Phase under 35. U.S.C. § 371 of International Application PCT/JP2015/071291, filed Jul. 27, 2015, which claims priority to Japanese Patent Application No. 2014-152094, filed Jul. 25, 2014. The disclosures of the above-described applications are hereby incorporated by reference in their entirety.

TECHNICAL FIELD

The present invention relates to a method for manufacturing a stacked iron core of a vehicle drive motor.

BACKGROUND ART

Patent Document 1 below describes a stacked iron core that is formed by sequentially swaging and laminating together ring-shaped iron core pieces made up from plural iron core segment pieces arranged in a ring shape.

RELATED DOCUMENTS

Related Patent Documents

Patent Document 1: Japanese Patent Application Laid-Open (JP-A) No. 2013-5628

SUMMARY OF INVENTION

Technical Problem

In the above-described stacked iron core, there is room for improvement from the viewpoint of reducing manufacturing costs due to the high cost of dedicated equipment for performing laminating at the same time as swaging. Moreover, the number of components and the number of assembly processes increase due to a configuration in which key components are attached to keyways when assembling a rotor of a vehicle drive motor.

In consideration of the above circumstances, an object of the present invention is to provide a method for manufacturing a stacked iron core of a vehicle drive motor that enables manufacturing costs to be reduced, and enables the number of components and the number of assembly processes for a vehicle drive motor to be reduced.

Solution to Problem

A method for manufacturing a stacked iron core of a vehicle drive motor, the manufacturing method comprising: a pressing process of pressing a strip-shaped magnetic steel sheet so as to manufacture a carrier-attached single sheet in which a plurality of circular arc-shaped iron core pieces, differing from each other in the presence or absence of a key protrusion and in the placement of the key protrusion, are coupled together by a coupling portion; a stacking process of sequentially cutting the circular arc-shaped iron core pieces out from the carrier-attached single sheet that is being conveyed, arranging the cut out circular arc-shaped iron core pieces into ring shapes to form ring-shaped iron core pieces, and, while forming the ring-shaped iron core pieces, stacking a plurality of the ring-shaped iron core pieces so that the plurality of the ring-shaped iron core pieces are phase-offset with respect to each other in a circumferential direction, to thereby manufacture a stacked iron core body with the key protrusions aligned along a stacking direction; and a welding process of welding each layer of the circular arc-shaped iron core pieces, which are phase-offset with respect to each other in the circumferential direction, along the stacking direction at a plurality of locations arranged around the circumferential direction of an inner circumferential portion or an outer circumferential portion of the stacked iron core body.

In the first aspect, the pressing process, the stacking process, and the welding process described above enable a stacked iron core of a vehicle drive motor to be manufactured such that dedicated equipment to perform swaging as the same time as stacking is rendered unnecessary. This enables manufacturing costs to be reduced as a result. Moreover, a stacked iron core that has key protrusions aligned along the stacking direction can be manufactured, to thereby enabling the number of components and the number of assembly processes of a vehicle drive motor to be reduced when assembling a rotor of the vehicle drive motor compared to a configuration in which key components are attached to keyways.

A second aspect of the present invention is the first aspect, wherein the circular arc-shaped iron core pieces include two types of circular arc-shaped iron core pieces formed with a short key protrusion, having a length along the circumferential direction of half a length of the key protrusions, at different respective end portions of both end portions in the circumferential direction.

The second aspect enables the key protrusions to be formed at the coupling portions of the circular arc-shaped iron core pieces by employing the two types of circular arc-shaped iron core pieces formed with the short key protrusions, having a length along the circumferential direction of half the length of the key protrusions, at different respective end portions of the two end portions in the circumferential direction.

Advantageous Effects of Invention

As explained above, the method for manufacturing a stacked iron core of a vehicle drive motor according to the present invention enables manufacturing costs to be reduced, and enables the number of components and the number of assembly processes of a vehicle drive motor to be reduced.

BRIEF DESCRIPTION OF DRAWINGS

FIG. 9 is a plan view illustrating six types of circular arc-shaped iron core pieces differing from each other in the presence or absence of a key protrusion and in the placement of the key protrusion.

FIG. 10 is a plan view illustrating an array of six types of circular arc-shaped iron core pieces that are sent toward a stacking assembly device.

DESCRIPTION OF EMBODIMENTS

Explanation follows regarding a method for manufacturing a stacked iron core of a vehicle drive motor according to an exemplary embodiment of the present invention, with reference to FIG. 1 to FIG. 10.

Configuration of Stacked Iron Core

First, explanation follows regarding a stacked iron core manufactured by a method for manufacturing a stacked iron core of a vehicle drive motor according to the present exemplary embodiment (referred to below simply as "stacked iron core").

Figure 1:
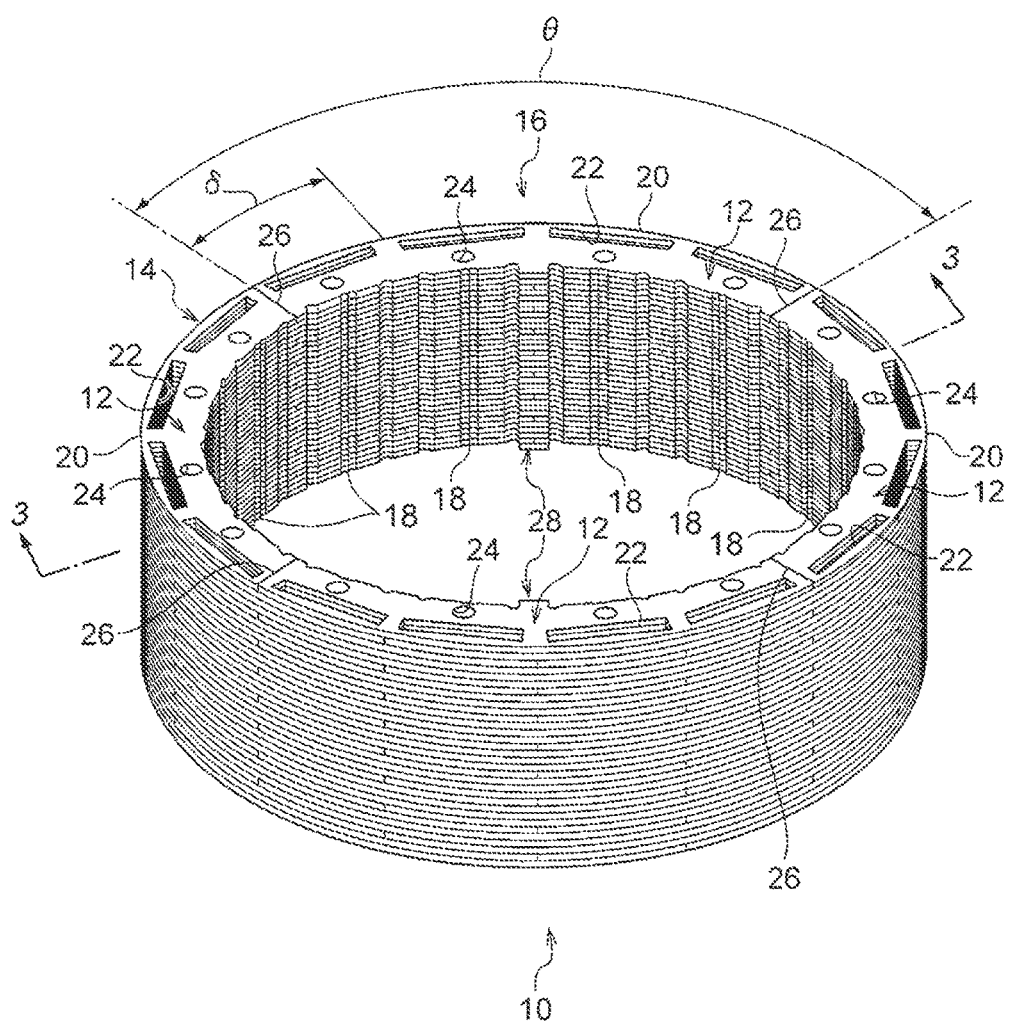
FIG. 1 is a perspective view of a stacked iron core for a vehicle drive motor according to an exemplary embodiment of the present invention.

As illustrated in FIG. 1, a stacked iron core 10 is a stacked rotor iron core employed on the rotor side of a vehicle drive motor (an electric motor), and is a configuration element of a magnetic rotor. Plural ring-shaped iron core pieces 14, in which iron core pieces 12 having quarter-circle arc shapes (divided iron core pieces) are arranged in a ring shape, are stacked together to configure a stacked iron core body 16. The stacked iron core 10 is formed by integrating the stacked iron core body 16 using plural weld portions 18.

Each circular arc-shaped iron core piece 12 is set with a circular arc angle θ of 90° in the present exemplary embodiment. Plural (four here) circular arc-shaped magnet mounting portions 20 (magnetic pole pieces) arranged along a circumferential direction are formed at an outer circumferential portion of each circular arc-shaped iron core piece 12. The magnet mounting portions 20 are each set with a circular arc angle δ of 22.5 degrees, and magnet mounting holes 22 for mounting magnets are formed in each magnet mounting portion 20.

Moreover, plural (four here) circular guide holes 24 arranged around the circumferential direction are formed in a width direction intermediate portion (intermediate portion between the outer circumference and the inner circumference) of each circular arc-shaped iron core piece 12. The guide holes 24 are pilot holes for inserting guide pins 68 (see FIG. 7) that are provided to an alignment jig 62 (see FIG. 7 and FIG. 8) employed when stacking the plural ring-shaped iron core pieces 14 and when welding the stacked iron core body 16.

In a state in which the ring-shaped iron core pieces 14 are configured with the circular arc-shaped iron core pieces 12 arranged in ring shapes, the guide holes 24 and the magnet mounting portions 20 are provided so as to be placed every 22.5 degrees, and the guide holes 24 are provided in-phase with the magnet mounting portions 20 in the circumferential direction of the ring-shaped iron core pieces 14.

Figure 2:
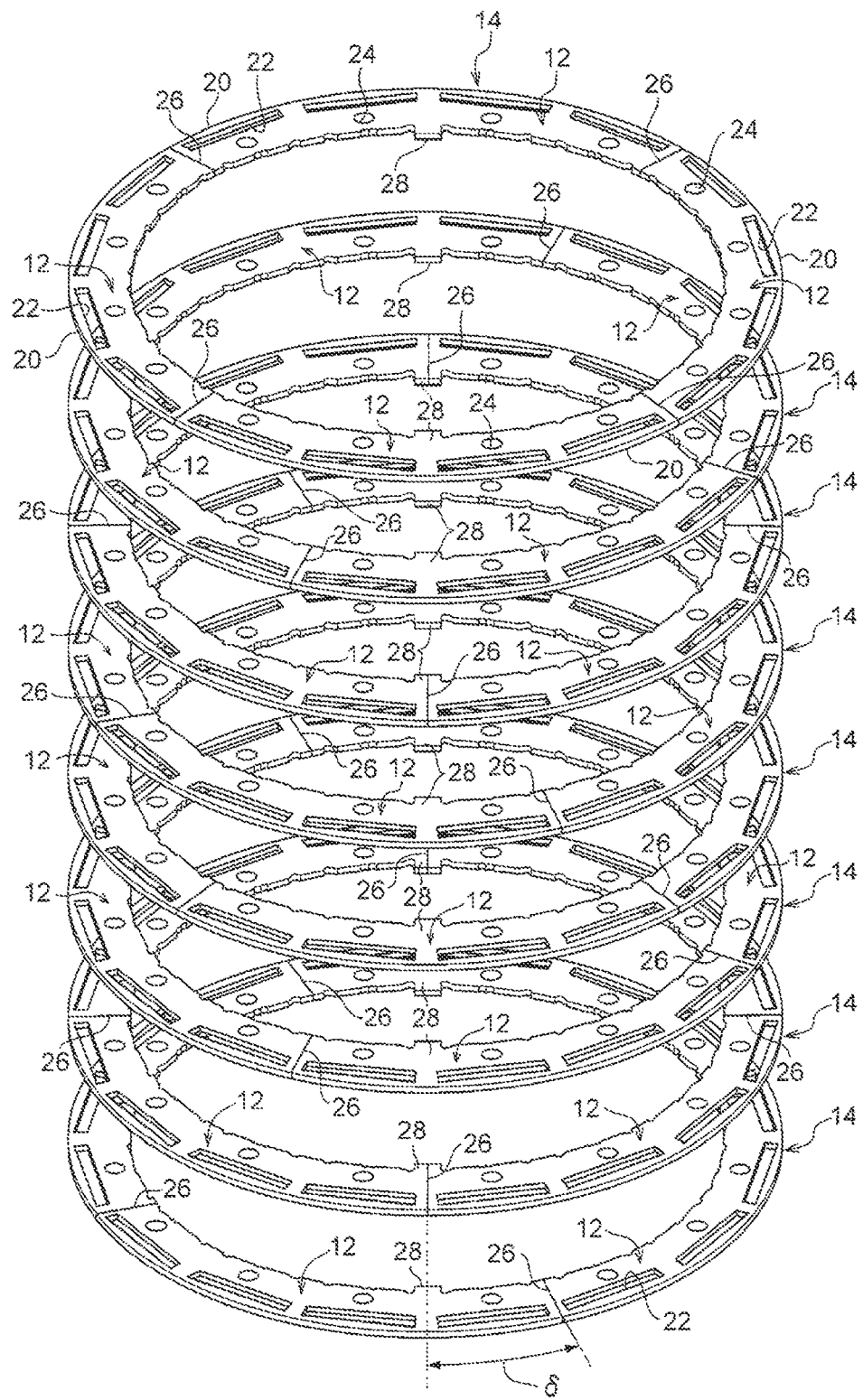
FIG. 2 is an exploded perspective view illustrating partial configuration of the same stacked iron core.
Figure 3:
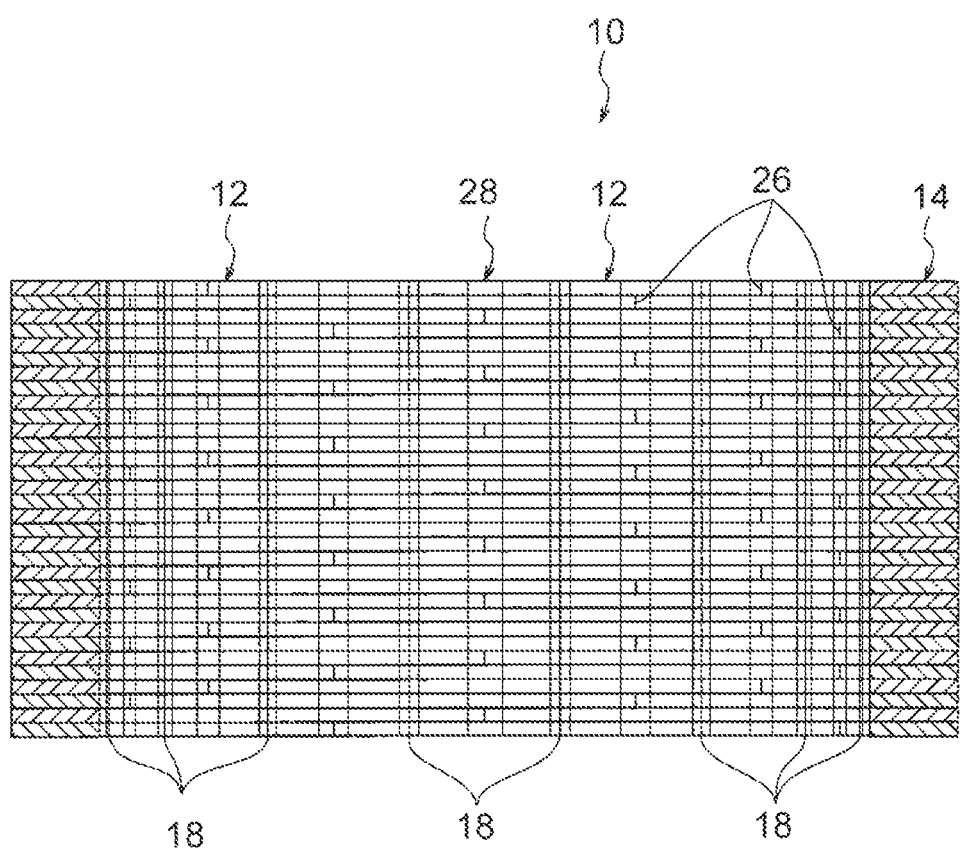
FIG. 3 is a schematic cross-section illustrating a cross-section taken along cross-section line 3-3 in FIG. 1.

As illustrated in FIG. 2, the ring-shaped iron core pieces 14 overlapped on each other are stacked with a specific number of layers in so-called brick stacking, in which joints 26 between the circular arc-shaped iron core pieces 12 around the circumferential direction are phase-offset with respect to each other around the circumferential direction. In the present exemplary embodiment, the angle of this phase-offset is set to 22.5 degrees: the same as the circular arc angle δ of the magnet mounting portions 20.

When the ring-shaped iron core pieces 14 that are phase-offset 22.5 degrees from each other are stacked, the magnet mounting portions 20 and the guide holes 24 are placed every 22.5 degrees, such that the positions of the respective magnet mounting portions 20 and guide holes 24 are aligned in a stacking direction. The magnet mounting portions 20 and the guide holes 24 thus penetrate the stacked iron core body 16 from one axial line direction end side to another axial line direction side.

As illustrated in FIG. 1, the plural weld portions 18, where the plural stacked ring-shaped iron core pieces 14 are integrated together as described above, are provided arranged around the circumferential direction at inner circumferential portions of the stacked iron core body 16. In the present exemplary embodiment, the number of plural weld portions 18 provided (sixteen here) is the same as the number of magnetic poles in the stacked iron core body 16, and the weld portions 18 weld (join) together, along the stacking direction, the respective layers of the circular arc-shaped iron core pieces 12 that are phase-offset with respect to each other around the circumferential direction.

Moreover, the plural weld portions 18 are positioned at the opposite side of the guide holes 24 to the magnet mounting portions 20 and are provided every 22.5 degrees around the inner circumferential portions of the stacked iron core body 16.

In the present exemplary embodiment, a pair of key protrusions 28 are formed at inner circumferential portions of the stacked iron core 10 at positions opposing each other, and the key protrusions 28 are each formed at an intermediate position between adjacent weld portions 18. Note that the pair of key protrusions 28 form coupling portions for when the stacked iron core 10 is assembled to a rotor of a vehicle drive motor.

Types of Circular Arc-Shaped Iron Core Pieces

As illustrated in FIG. 9, among the circular arc-shaped iron core pieces 12, there are six types of circular arc-shaped iron core pieces 12A, 12B, 12C, 12D, 12E, and 12F that differ from each other in the presence or absence of the key protrusions 28 and in the placement of the key protrusions 28. A short key protrusion 29 that has a circumferential direction length of half the length of the key protrusions 28 is formed on one end (the upper end in FIG. 9) out of the two circumferential direction ends of the circular arc-shaped iron core piece 12A. A key protrusion 28 is formed on the circular arc-shaped iron core piece 12B at a position 22.5 degrees from the circumferential direction center in the one end direction (the upper end in FIG. 9). A key protrusion 28 is formed at the circumferential direction center of the circular arc-shaped iron core piece 12C. A key protrusion 28 is formed on the circular arc-shaped iron core piece 12D at a position 22.5 degrees from the circumferential direction center in another end direction (the lower end in FIG. 9). A short key protrusion 29 that has a circumferential direction length of half the length of the key protrusions 28 is also formed on the other end (the lower end in FIG. 9) out of the two circumferential direction ends of the circular arc-shaped iron core piece 12E. A key protrusion 28 is not formed on the circular arc-shaped circular arc-shaped iron core piece 12F. Note that the short key protrusion 29 of the circular arc-shaped iron core piece 12A and the short key protrusion 29 of the circular arc-shaped iron core piece 12E are coupled together in the circumferential direction so as to form a key protrusion 28.

Method for Manufacturing the Stacked Iron Core 10

Next, explanation follows regarding a method for manufacturing the laminated iron core 10 having the above configuration.

The method for manufacturing the laminated iron core 10 is configured by: a pressing process, this being a first process; a stacking process, this being a second process; a welding process, this being a third process; and an inspection process, this being a fourth process.

Pressing Process

Figure 4:
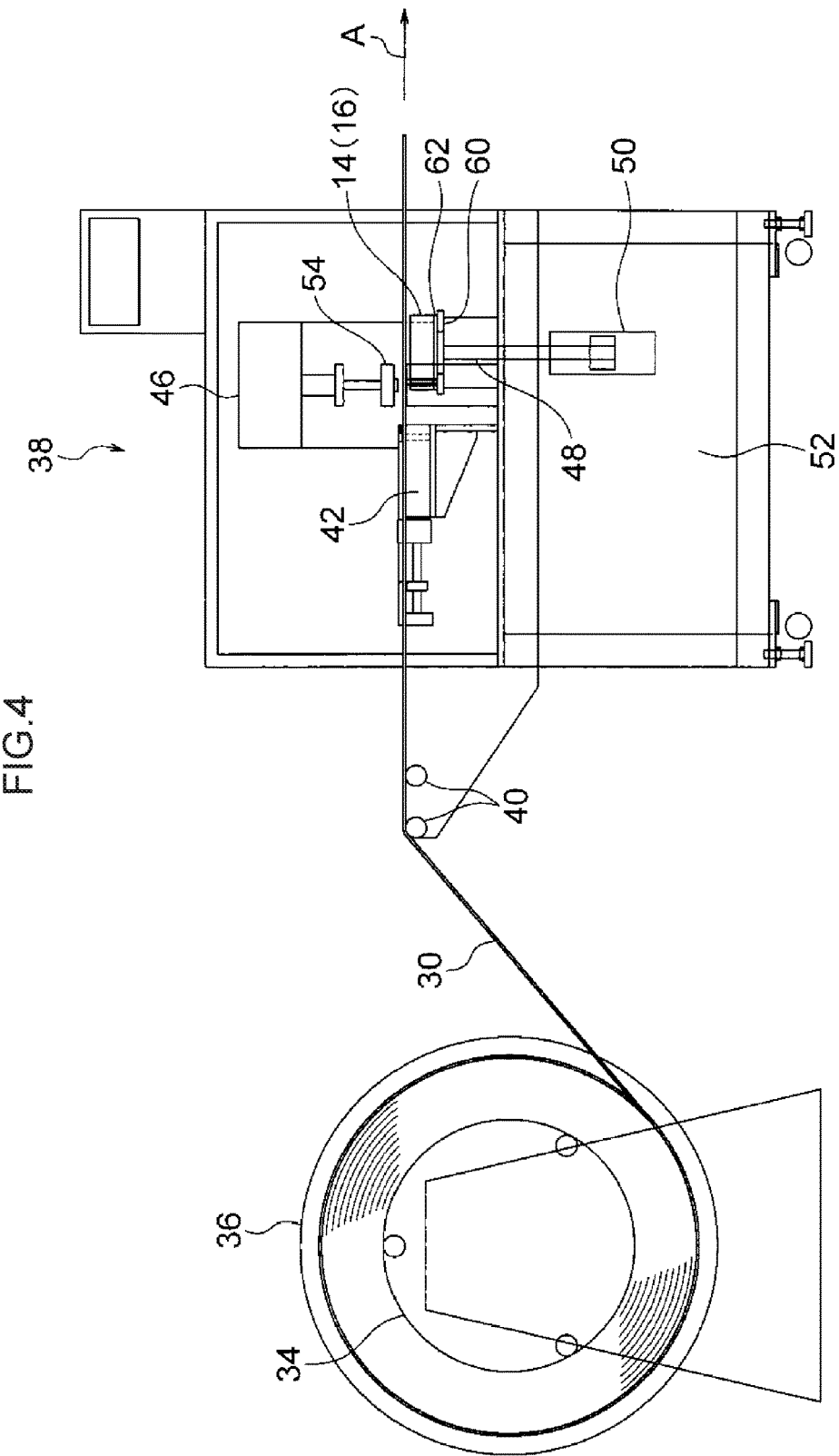
FIG. 4 is a front view illustrating configuration of a stacking assembly device employed in a stacking process, as well as the surroundings thereof.
Figure 5:
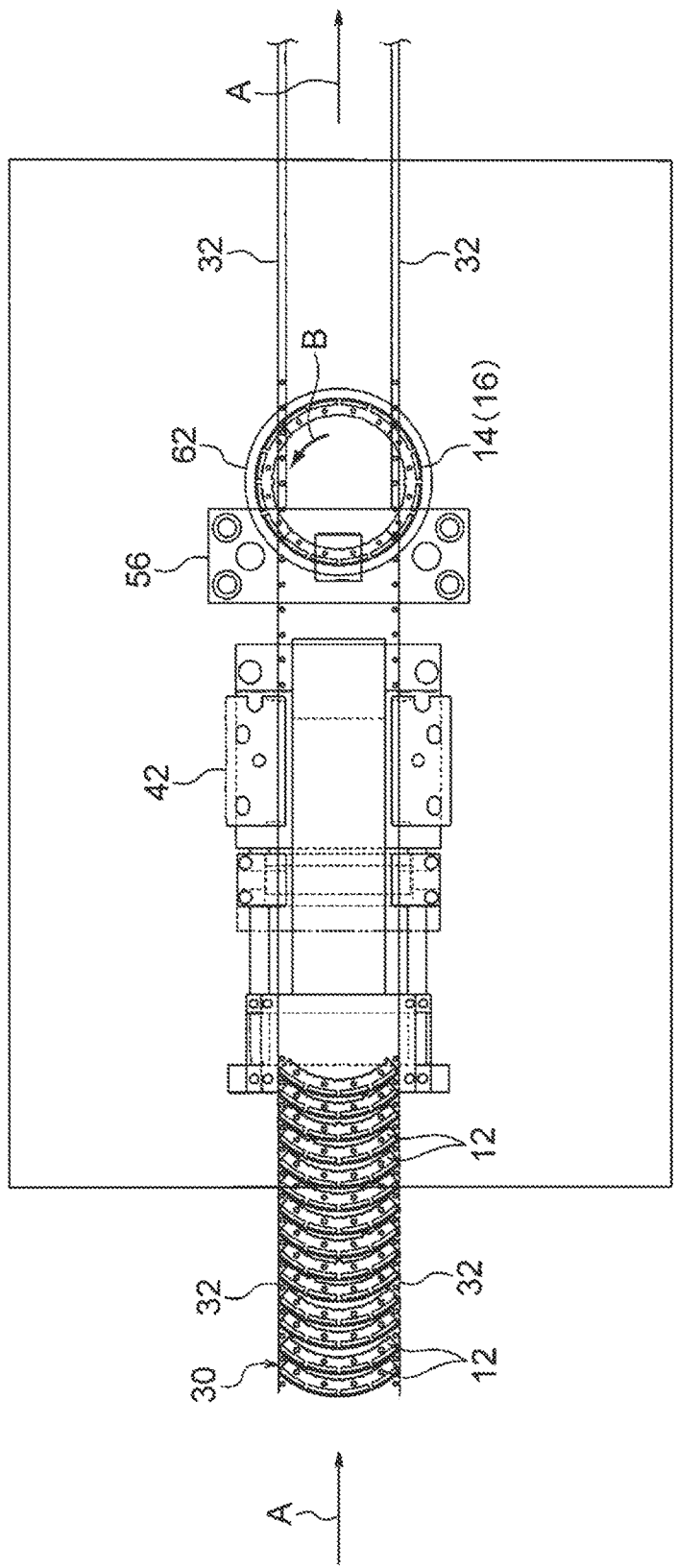
FIG. 5 is a plan view of the interior of the same stacking assembly device, as viewed from above.
Figure 6:
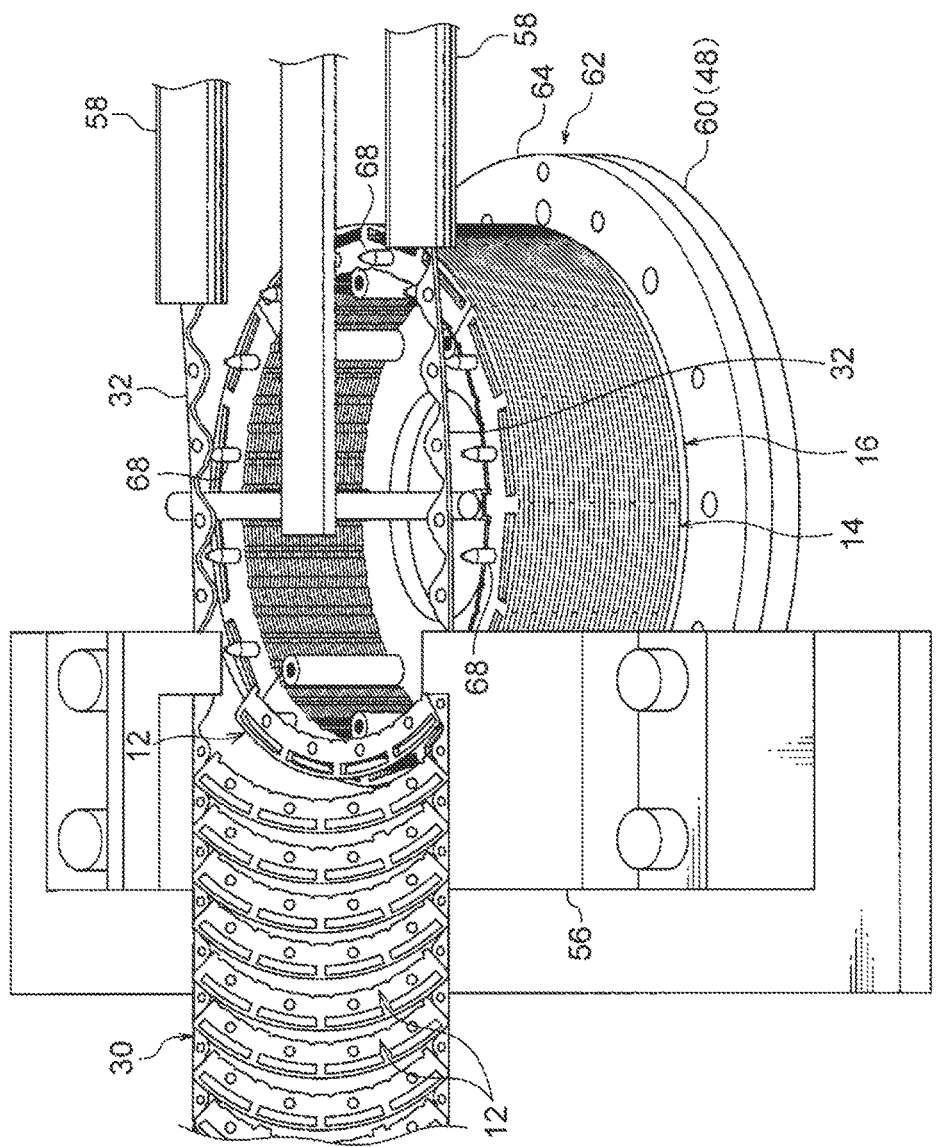
FIG. 6 is an enlarged perspective view illustrating relevant portions of the same stacking assembly device.

As illustrated in FIG. 4 to FIG. 6, in the pressing process, a strip-shaped magnetic steel sheet is pressed by a mold to manufacture a carrier-attached single sheet 30 in which plural circular arc-shaped iron core pieces 12 are coupled together by a pair of coupling portions 32. The manufactured carrier-attached single sheet 30 is wound around a reel 34, and then processing moves on to the stacking process.

In the pressing process, slit cutting portions (not illustrated in the drawings) provided at five locations in a press mechanism are ON/OFF controlled such that the six types of circular arc-shaped iron core pieces 12A, 12B, 12C, 12D, 12E, and 12F (see FIG. 9), which differ from each other in the presence or absence of key protrusions 28 and in the placement of the key protrusions 28, are formed by pressing the carrier-attached single sheet 30.

Stacking Process

In the stacking process, the circular arc-shaped iron core pieces 12 are sequentially cut out from the carrier-attached single sheet 30 being conveyed, the cut out circular arc-shaped iron core pieces 12 are arranged in ring shapes to form the ring-shaped iron core pieces 14, and, while this is being performed, the plural ring-shaped iron core pieces 14 are stacked so as to be phase-offset with respect to each other around the circumferential direction to manufacture the stacked iron core body 16. More specifically, first, the reel 34 is attached to a reel stand 36 illustrated in FIG. 4, the carrier-attached sheet 30 wound onto the reel 34 is unwound and wound out by guide rollers 40 of a stacking assembly device 38 illustrated in FIG. 4 and FIG. 5, and is inserted into the stacking assembly device 38.

A feeder 42, a servo press 46, an electric indexer 48, a ROBO cylinder 50, and a control panel 52 for controlling the operation thereof, are provided inside the stacking assembly device 38. The feeder 42 retains the carrier-attached single sheet 30 that has been inserted into the stacking assembly device 38 and conveys the carrier-attached single sheet 30 toward the servo press 46 and the electric indexer 48 side. Note that the direction indicated by the arrow A in FIG. 4 and FIG. 5 is the direction in which the carrier-attached single sheet 30 is conveyed. The circular arc-shaped iron core pieces 12 are disposed at right angles to the conveyance direction of the carrier in order for good material take-up efficiency, and in order to avoid deformation in the circular arc-shaped iron core pieces 12 such as warping when the carrier is wound and stored.

A joining portion cutter punch 54 is attached to the servo press 46, and the circular arc-shaped iron core pieces 12 are sequentially cut out from the coupling portions 32 of the carrier-attached single sheet 30 as it is conveyed between the joining portion cutter punch 54 and a joining portion cutter die 56 installed below the joining portion cutter punch 54. The coupling portions 32 from which the circular arc-shaped iron core pieces 12 have been cut out are passed through the inside of conveyance pipes 58 illustrated in FIG. 6 (not illustrated in FIG. 4 and FIG. 5) and ejected from the stacking assembly device 38, and then conveyed to a scrap cutter, not illustrated in the drawings.

Figure 7:
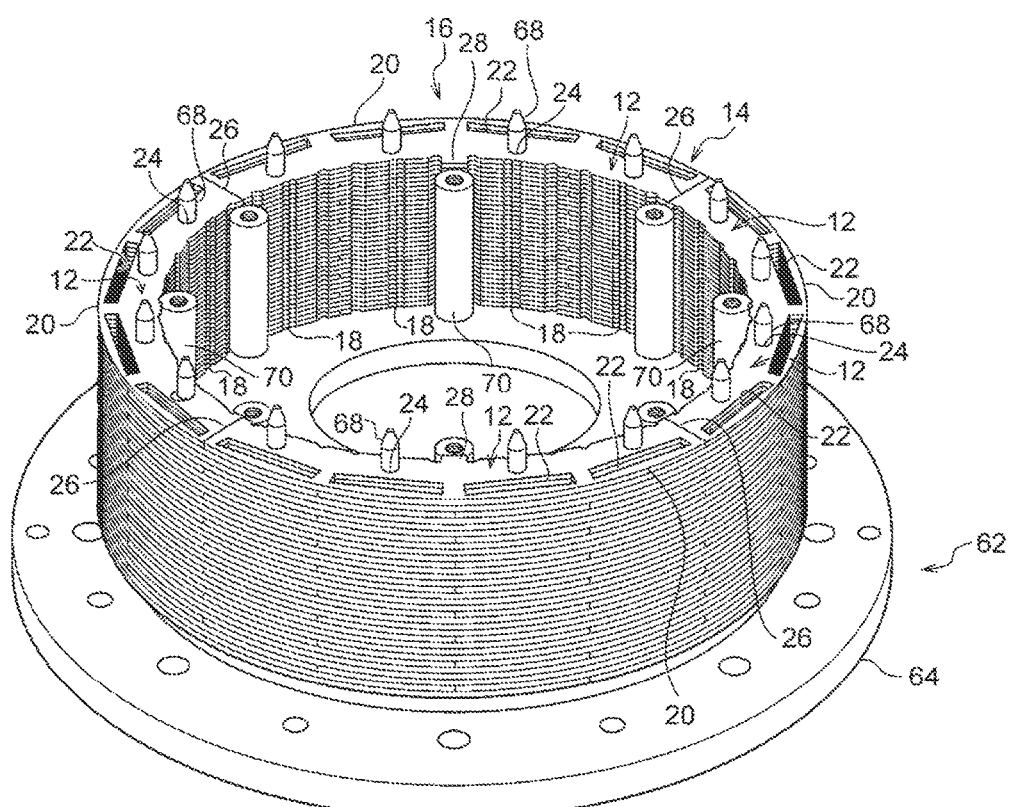
FIG. 7 is a perspective view illustrating a stacked iron core body that is stacked on an alignment jig.

The punch 54 described above pushes the cut out circular arc-shaped iron core pieces 12 onto an alignment jig 62 that is detachably attached to a turntable 60 of the electric indexer 48. As illustrated in FIG. 6 and FIG. 7, the alignment jig 62 includes a ring-shaped lower plate 64, plural (sixteen here) of the guide pins 68 (pilot pins) that project out upward from the lower plate 64, and plural (eight here) support columns 70 that project out upward from the alignment jig 62. Note that the number of guide pins 68 and support columns 70 may be modified as appropriate.

The sixteen guide pins 68 are arranged around the circumferential direction of the lower plate 64 at a uniform spacing (at 22.5 degree intervals) and firmly fixed to the lower plate 64. The eight support columns 70, which are further to the inner circumferential side of the lower plate 64 than the respective sixteen guide pins 68, are arranged around the circumferential direction of the lower plate 64 at a uniform spacing (at 45 degree intervals), and are firmly fixed to the lower plate 64. Note that the alignment jig 62 is configured including the ring-shaped upper plate 72 illustrated in FIG. 8; however, the alignment jig 62 may be employed in the stacking process in a state in which upper plate 72 has been removed.

Each circular arc-shaped iron core piece 12 that has been pushed onto the alignment jig 62 is retained on the alignment jig 62 in a state in which the guide pins 68 have been respectively inserted into its four guide holes 24. The alignment jig 62 is linked to the feeder 42 and the servo press 46 and is rotated about its vertical axis by the turntable 60 of the electric indexer 48, and is lowered by the ROBO cylinder 50 at a specific timing.

More specifically, first, the circular arc-shaped iron core pieces 12 are arranged in a ring shape to form a ring-shaped iron core piece 14, and for each one of the circular arc-shaped iron core piece 12 pushed onto the alignment jig 62, the alignment jig 62 is rotated 90 degrees (the circular arc angle θ of each circular arc-shaped iron core piece 12) in the arrow B direction in FIG. 5. One layer of the ring-shaped iron core pieces 14 is completed by repeating this 90 degree rotation three times. Next, the alignment jig 62 is lowered by the ROBO cylinder 50 by an amount corresponding to the plate thickness of the circular arc-shaped iron core pieces 12, and the alignment jig 62 is rotated 22.5 degrees (the phase-offset angle δ) in the arrow B direction in FIG. 5 by the electric indexer 48. The plural ring-shaped iron core pieces 14 are stacked (rotationally stacked) so as to be phase-offset with respect to each other around the circumferential direction to manufacture the stacked iron core body 16 by sequentially repeating the above process.

As illustrated in FIG. 10, in the present exemplary embodiment, by sequentially arranging the circular arc-shaped iron core pieces 12C, 12F, 12C, 12F in a ring shape around the circumferential direction, the first ring-shaped iron core piece 14 layer is completed. Then, by sequentially arranging circular arc-shaped iron core pieces 12F, 12B, 12F, 12B in a ring shape around the circumferential direction, the ring-shaped second iron core piece 14 layer is completed. Then, by sequentially arranging circular arc-shaped iron core pieces 12A, 12E, 12A, 12E in a ring shape around the circumferential direction, the third ring-shaped iron core piece 14 layer is completed. Then, by sequentially arranging circular arc-shaped iron core pieces 12D, 12F, 12D, 12F in a ring shape around the circumferential direction, the fourth ring-shaped iron core piece 14 layer is completed. Then, by sequentially arranging circular arc-shaped iron core pieces 12F, 12C, 12F, 12C in a ring shape around the circumferential direction, the fifth ring-shaped iron core piece 14 layer is completed. Then, by sequentially arranging circular arc-shaped iron core pieces 12B, 12F, 12B, 12F in a ring shape around the circumferential direction, the sixth ring-shaped iron core piece 14 layer is completed. Then, by sequentially arranging circular arc-shaped iron core pieces 12E, 12A, 12E, 12A in a ring shape around the circumferential direction, the seventh ring-shaped iron core piece 14 layer is completed. Then, by sequentially arranging a circular arc-shaped iron core piece 12F, 12D, 12F, 12D in a ring shape around the circumferential direction, the eighth ring-shaped iron core piece 14 layer is completed. Note that the direction indicated by the arrow A in FIG. 10 is the conveyance direction of the circular arc-shaped iron core pieces 12.

Accordingly, the ring-shaped iron core pieces 14 are stacked by the stacking process, and the positions of the key protrusions 28 align in the stacking direction in the present exemplary embodiment. Then, the manufactured stacked iron core body 16 together with the alignment jig 62 is removed from the turntable 60, and processing transitions to the welding process.

Welding Process

Figure 8:
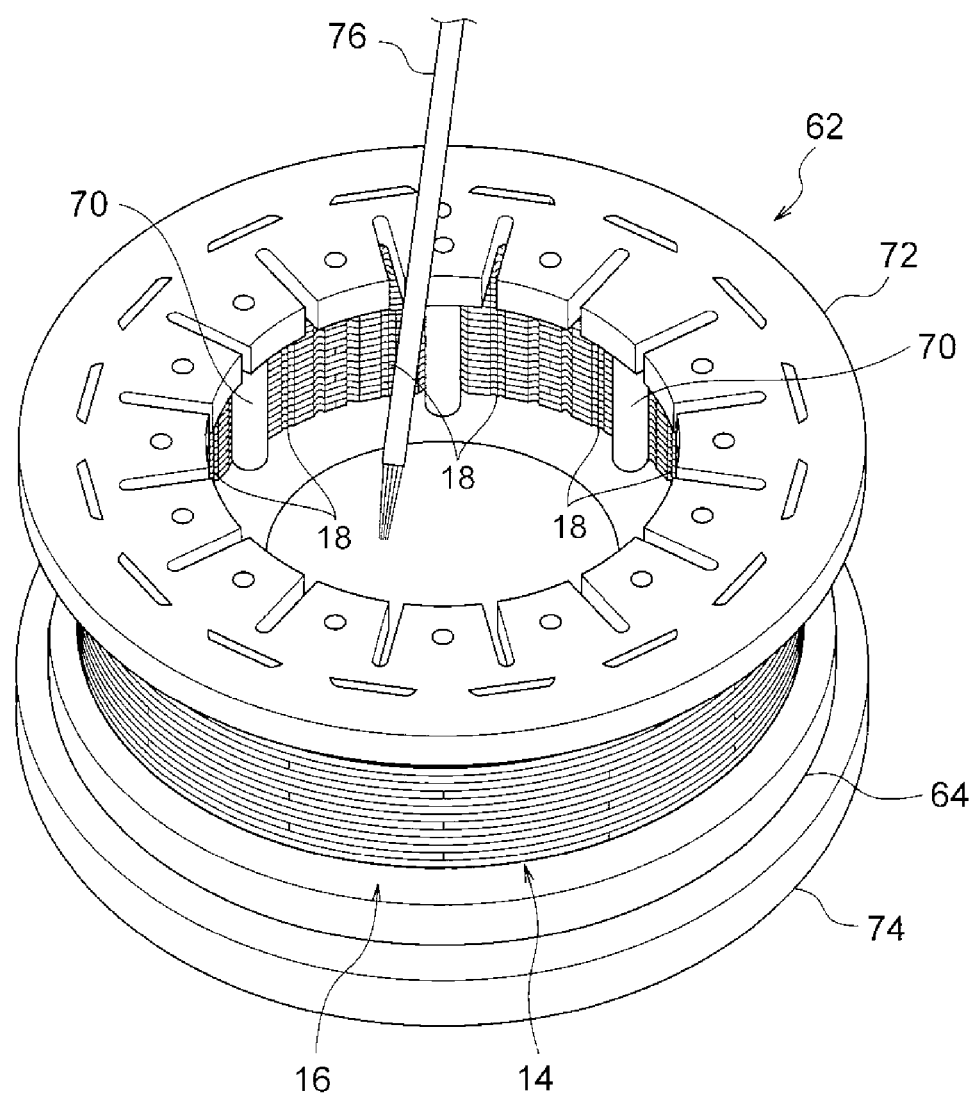
FIG. 8 is a perspective view illustrating a situation in which a stacked iron core body is welded in a welding process.

In the welding process, each of the layers of the circular arc-shaped iron core pieces 12, which are phase-offset with respect to each other in the circumferential direction, are welded together along the stacking direction at plural locations (sixteen locations here; see the weld portions 18 in FIG. 1 and FIG. 3) arranged around the circumferential direction of the inner circumferential portions of the stacked iron core body 16. More specifically, first, as illustrated in FIG. 8, the upper plate 72 is attached to the alignment jig 62. The upper plate 72 is fixed to respective upper ends of the eight support columns 70 by bolt-fastening, for example, and retains the stacked iron core body 16 at a specific thickness. Alternatively, the stacked iron core body 16 is retained at a specific thickness by a dedicated clamping device that clamps the upper plate 72 and the lower plate 64 between the eight support columns 70 from above and below.

Next, as illustrated in FIG. 4, the alignment jig 62 is attached onto the turntable 60 that includes a fiber laser welder, and the welding described above is performed by the fiber laser welder. Note that the member that has the numeral 76 in FIG. 8 is the torch of the fiber laser welder. The stacked iron core 10 is thus completed. The completed stacked iron core is then subject to specific inspection in the next process, this being the inspection process.

Operation and Advantageous Effects

Next, explanation follows regarding operation and advantageous effects of the present exemplary embodiment.

In the present exemplary embodiment, the stacked iron core 10 is manufactured according to the pressing process, the stacking process, and the welding process described above. In the stacked iron core 10, the plural ring-shaped iron core pieces 14 of the stacked iron core body 16 that are respectively configured by the plural circular arc-shaped iron core pieces 12 arranged in ring shapes are stacked together so as to be phase-offset with respect to each other in the circumferential direction. The plural weld portions 18 arranged around the circumferential direction are provided at inner circumferential portions of the stacked iron core body 16. Each layer of the circular arc-shaped iron core pieces 12 that are phase-offset with respect to each other around the circumferential direction are welded along the stacking direction at the weld portions 18. The stacked iron core 10 of the present exemplary embodiment can be manufactured including the key protrusions 28 aligned in the stacking direction.

This enables each layer of the circular arc-shaped iron core pieces 12 to be integrally joined together, such that dedicated equipment to perform swaging at the same time as laminating is rendered unnecessary, enabling manufacturing costs to be reduced.

Moreover, the key protrusions 28 are provided to inner circumferential portions of the stacked iron core 10, such that key components are unnecessary when assembling a rotor of a vehicle drive motor. This enables the number of components and the number of assembly processes of a vehicle drive motor to be reduced compared to a configuration in which key components are attached to keyways.

The present exemplary embodiment easily replaces a conventional configuration that includes the key protrusions 28 and in which the ring-shaped iron core pieces 14 are not divided into the plural circular arc-shaped iron core pieces 12.

The present exemplary embodiment employs the two types of circular arc-shaped iron core pieces 12A, 12E formed with the short key protrusions 29 that have lengths in the circumferential direction of half the length of the key protrusions at different end portions of the two end portions in the circumferential direction. The short key protrusion 29 of the circular arc-shaped iron core piece 12A and the short key protrusion 29 of the circular arc-shaped iron core piece 12E are coupled together around the circumferential direction, thereby enabling a key protrusion 28 to be formed at the portion where the circular arc-shaped iron core piece 12A and the circular arc-shaped iron core piece 12E are coupled together.

Supplementary Explanation of Exemplary Embodiment

In the above exemplary embodiment, the pair of key protrusions 28 are formed at positions on inner circumferential portions of the stacked iron core 10 that oppose each other; however, the present invention is not limited thereto, and the number of key protrusions 28 on the stacked iron core body 16 may be modified as appropriate.

Among the circular arc-shaped iron core pieces 12 of the above exemplary embodiment, there are six types of circular arc-shaped iron core pieces that differ from each other in the presence or absence of key protrusions 28 and in the placement of the key protrusions 28. However, the present invention is not limited thereto, and may be appropriately modified with a configuration other than with the six types of circular arc-shaped iron core pieces 12 that differ from each other in the presence or absence of key protrusions 28 and in the placement of the key protrusions 28. Moreover, configuration may be made without the circular arc-shaped iron core pieces 12A, 12E that include the short key protrusions 29 having a length in the circumferential direction of half the length of the key protrusions. Note that in cases in which the key protrusions 28 were omitted, the circular arc-shaped iron core pieces 12 would have excess portions cut away so as to be offset further toward the outer circumferential side than the inner core radius of the key protrusions 28 in order to avoid interference with other members incorporated on the inner circumferential side of the circular arc-shaped laminated iron core.

In the above exemplary embodiment, the stacked iron core body 16 is configured with sixteen poles; however, the present invention is not limited thereto, and the number of magnetic poles in the stacked iron core body 16 may be modified as appropriate.

In the present exemplary embodiment, configuration is made in which the number of weld portions 18 that are provided is the same as the number of the magnetic poles of the stacked iron core body 16; however, the present invention is not limited thereto, and the number of weld portions may be modified as appropriate. For example, configuration may be made in which the number of weld portions provided is half the number of the magnetic poles of the stacked iron core body.

In the above exemplary embodiment, configuration is made in which the weld portions 18 and the magnet mounting portions 20 are provided on opposite sides of the guide holes 24 to each other. However, the present invention is not limited thereto, and configuration may be made in which the weld portions and the guide holes are provided offset with respect to each other in the circumferential direction of the circular arc-shaped iron core pieces.

In the above exemplary embodiment, configuration is made in which the weld portions 18 are provided on the inner circumferential portions of the stacked iron core body 16; however, the present invention is not limited thereto, and configuration may be made in which the weld portions are provided at outer circumferential portions of the stacked iron core body.

Various other modifications may be implemented within a range not departing from the spirit of the present invention. Obviously, the scope of rights encompassed by the present invention is not limited to the above exemplary embodiment.

The entire contents of the disclosure of Japanese Patent Application No. 2014-152094 are incorporated by reference in the present specification. All cited documents, patent applications, and technical standards mentioned in the present specification are incorporated by reference in the present specification to the same extent as if the individual cited document, patent application, or technical standard was specifically and individually indicated to be incorporated by reference.

EXPLANATION OF THE REFERENCE NUMERALS

10 stacked iron core of vehicle drive motor
12 circular arc-shaped iron core piece
14 ring-shaped iron core piece
16 stacked iron core body
18 weld portion
28 key protrusion
29 short key protrusion
30 carrier-attached single sheet
32 coupling portion

What is claimed is:

1. A method for manufacturing a stacked iron core of a vehicle drive motor, the manufacturing method comprising:
    a pressing process of pressing a strip-shaped magnetic steel sheet so as to manufacture a carrier-attached single sheet in which a plurality of circular arc-shaped iron core pieces, differing from each other in the presence or absence of a key protrusion and in the placement of the key protrusion, are coupled together by a coupling portion;
    a stacking process of sequentially cutting the circular arc-shaped iron core pieces out from the carrier-attached single sheet that is being conveyed, arranging the cut out circular arc-shaped iron core pieces into ring shapes to form ring-shaped iron core pieces, and, while forming the ring-shaped iron core pieces, stacking a plurality of the ring-shaped iron core pieces so that the plurality of the ring-shaped iron core pieces are phase-offset with respect to each other in a circumferential direction, to thereby manufacture a stacked iron core body with the key protrusions aligned along a stacking direction; and
    a welding process of welding each layer of the circular arc-shaped iron core pieces, which are phase-offset with respect to each other in the circumferential direction, along the stacking direction at a plurality of locations arranged around the circumferential direction of an inner circumferential portion or an outer circumferential portion of the stacked iron core body.

2. The method for manufacturing a stacked iron core of a vehicle drive motor of claim 1, wherein the circular arc-shaped iron core pieces include two types of circular arc-shaped iron core pieces formed with a short key protrusion, having a length along the circumferential direction of half a length of the key protrusions, at different respective end portions of both end portions in the circumferential direction.

3. The method for manufacturing a stacked iron core of a vehicle drive motor of claim 1, wherein the circular arc-shaped iron core pieces are disposed at right angles to a conveyance direction of the magnetic steel sheet, in the pressing process.

* * * * *